United States Patent
Katti et al.

(10) Patent No.: US 8,571,267 B2
(45) Date of Patent: Oct. 29, 2013

(54) IMAGE BASED STRUCTURAL CHARACTERIZATION OF FIBROUS MATERIALS

(75) Inventors: Dhirendra S. Katti, Kanpur (IN); Anupam Pal, Kanpur (IN); Shaunak G. Pandya, Ahmedabad (IN)

(73) Assignee: Indian Institute of Technology Kanpur, Kanpur (IN)

( * ) Notice: Subject to any disclaimer, the term of this patent is extended or adjusted under 35 U.S.C. 154(b) by 483 days.

(21) Appl. No.: 12/870,569

(22) Filed: Aug. 27, 2010

(65) Prior Publication Data

US 2011/0299784 A1    Dec. 8, 2011

(30) Foreign Application Priority Data

Jun. 2, 2010    (IN) .......................... 1287/DEL/2010

(51) Int. Cl.
    *G06K 9/00*    (2006.01)
(52) U.S. Cl.
    USPC ........... 382/111; 382/108; 382/110; 382/141; 382/190; 382/199
(58) Field of Classification Search
    USPC .......... 382/108, 110, 111, 141, 190, 199, 197
    See application file for complete search history.

(56) References Cited

U.S. PATENT DOCUMENTS

| | | | |
|---|---|---|---|
| 3,739,183 A | 6/1973 | Burton et al. | |
| 4,737,648 A | 4/1988 | Smith et al. | |
| 4,841,223 A | 6/1989 | Baum et al. | |
| 5,309,221 A | 5/1994 | Fischer et al. | |
| 5,311,290 A | 5/1994 | Olson et al. | |
| 5,841,892 A * | 11/1998 | McGrath et al. | 382/141 |
| 6,099,960 A | 8/2000 | Tennent et al. | |
| 6,370,271 B2 | 4/2002 | Fu et al. | |
| 6,806,955 B2 | 10/2004 | Jang | |
| 2005/0047643 A1* | 3/2005 | Lowe | 382/141 |
| 2008/0281554 A1* | 11/2008 | Cork et al. | 702/150 |

OTHER PUBLICATIONS

Ashammakhi, N. et al., "Advancing tissue engineering by using electrospun nanofibers," *Regenerative Medicine*, Jul. 2008, vol. 3, No. 4, pp. 547-574.

Balguid, A. et al., "Tailoring Fiber Diameter in Electrospun Poly(epsilon-Caprolactone) Scaffolds for Optimal Cellular Infiltration in Cardiovascular Tissue Engineering," *Tissue Engineering: Part A*, Feb. 2009, vol. 15, No. 2, pp. 437-444.

Chen, M. et al., "Role of Fiber Diameter in Adhesion and Proliferation of NIH 3T3 Fibroblast on Electrospun Polycaprolactone Scaffolds," *Tissue Engineering*, Mar. 2007, vol. 13, No. 3, pp. 579-587.

"Nanotechnology: Looking As We Leap," Environmental Health Perspectives, vol. 112, No. 13, (Sep. 2004) pp. A740-A749.

(Continued)

*Primary Examiner* — Wesley Tucker
(74) *Attorney, Agent, or Firm* — Foley & Lardner LLP

(57) ABSTRACT

A method for characterizing a fibrous material having a plurality of fibers is provided. The method includes accessing an image of the fibrous material with the plurality of fibers and identifying each of the plurality of fibers based upon a magnitude and a direction of an intensity gradient of the image. The method also includes tracking each of the identified fibers based upon at least one of a diameter of the fiber, a fiber alignment angle and a vector orientation angle of the fiber and estimating a plurality of structural parameters for each of the tracked fibers of the fibrous material.

20 Claims, 7 Drawing Sheets

(56) References Cited

OTHER PUBLICATIONS

Ahmad, F., "Orientation of short fibers in powder injection molded aluminum matrix composites," Journal of Materials Processing Technology, vol. 169 (2005) pp. 263-269.
Baker, B. M., "The Effect of Nanofiber Alignment on the Maturation of Engineered Meniscus Constructs," Biomaterials, vol. 28 (2007) pp. 1967-1977.
Sander, E.A., et al., "Comparison of 2D fiber network orientation measurements methods," Feb. 2008, Journal of Biomedical Materials Research Part A, 88(2), pp. 322-331.
Canny J., "A Computational Approach to Edge Detection," IEEE Transactions on Pattern Analysis and Machine Intelligence, vol. PAMI-8, No. 6, (1986) pp. 679-698.
Christopherson, G. T., "The influence of fiber diameter of electrospun substrates on neural stem cell differentiation and proliferation," Biomaterials, vol. 30 (2009) pp. 556-564.
eSpin Technologies, Inc. [Online], 2009 [retrieved on Aug. 2, 2010]. Retrieved from the Internet: <URL:http://www.espintechnologies.com/products.htm>.
Frenot, A., "Polymer nanofibers assembled by electrospinning," Current Opinion in Colloid & Interface Science, vol. 8, (2003), pp. 64-75.
Fuentes, N. O., "Image Characterization of Carbon Fibre Reinforced Composites," IV Conferencia Panamericana de END, Bueno Aires—Oct. 2007.
Gaudio, C., et al., "Structural characterization and cell response evaluation of electrospun PCL membranes: Micrometric versus submicrometric fibers," Journal of Biomedical Materials Research Part A, May 2008, pp. 1028-1039.
Ghasemi-Mobarakeh, L., et al., "A Novel Method for Porosity Measurement of Various Surface Layers of Nanofibers Mat Using Image Analysis for Tissue Engineering Applications," Journal of Applied Polymer Science, vol. 106, (2007) pp. 2536-2542.
Gilbert, T., et al., "Collagen fiber alignment and biaxial mechanical behavior of porcine urinary bladder derived extracellular matrix," Biomaterials, vol. 29 (2008) pp. 4775-4782.
Grafe, T., et al., "Polymeric Nanofibers and Nanofiber Webs: A New Class of Nonwovens," Atlanta, Georgia, International Nonwovens Technical Conference, Sep. 24-26, 2002.
Hegde, R. R., et al., "Nanofiber nonwovens," Material Science and Engineering, The University of Tennessee. [online], 2005 [retrieved Aug. 2, 2010]. Retrieved from the Internet: <URL:http:web.utk.edu/~mse/pages/Textiles/Nanofiber%20Nonwovens.htm>.
Huang, Z., et al., "A review on polymer nanofibers by electrospinning and their applications in nanocomposites," Composites Science and Technology, vol. 63, (2003) pp. 2223-2253.
Jena, A., et al., "Fast evaluation of average fiber diameters of nonwovens," International Nonwoven technical Conference (INTC) 2001.
Kwon, I., et al., "Electrospun nano- to microfiber fabrics made of biodegradable copolyesters: structural characteristics, mechanical properties and cell adhesion potential," Biomaterials, vol. 26 (2005) pp. 3929-3939.
Lee, C., et al., "Nanofiber alignment and direction of mechanical strain affect the ECM production of human ACL fibroblast," Biomaterials, vol. 26 (2005) pp. 1261-1271.
Luzhansky, D., "Quality control in manufacturing of electrospun nanofiber composites," Presented at INTC 2003: Internaltional Nonwoven Technical Conference, Baltimore, Maryland, Sep. 15-18, 2003.
Lybrand F., "Nanofibers," InterNano. [Online], 2009 [retrieved Aug. 2, 2010] Retrieved from the Internet: <URL:http://www.internano.org/content/view/153/157/>.
Moroni, L., et al., "Fiber diameter and texture of electrospun PEOT/PBT scaffolds influence human mesenchymal stem cell proliferation and morphology, and the release of incorporated compounds," Biomaterials, vol. 27 (2006), pp. 4911-4922.
New Zealand Wool Testing Authority Ltd. fiber_diameter.pdf. NZ Wool Testing Authority Ltd, Wool Testing Company New Zealand: NZWTA. "Fibre Fineness" [Online], 2009 [retrieved Aug. 2, 2010]. Retrieved from the Internet: <URL: http://www.nzwta.co.nz/docs/fibre_diameter.pdf>.
Otsu N., "A Threshold Selection Method from Gray-Level Histograms," IEEE Transactions on Systems, Man, and Cybernetics, vol. SMC-9, No. 1 (1979) pp. 62-66.
Pourdeyhimi, B., et al., "Measuring Fiber Diameter Distribution in Nonwovens," Textile Research Journal, vol. 69, (1999) pp. 233-236.
Qi K., et al., "Evaluation of the optical fibre diameter analyser (OFDA) for measuring fiber diameter parameters of sheep and goats," Journal of Animal Science, vol. 72, (1994) pp. 1675-1679.
Ramakrishna, S., et al., "Electrospun nanofibers: solving global issues," Materials Today, Mar. 2006, vol. 9, pp. 40-50.
Sell, S., et al., "Extracellular matrix regenerated: tissue engineering via electrospun biomimetic nanofibers," Polymer International, vol. 56, (2007) pp. 1349-1360.
Shin, E.H., et al., "Determination of Electrospun Fiber Diameter Distributions Using Image Analysis Processing," Macromolecular Research, vol. 16, No. 4 (2008) pp. 314-319.
Tian, F. et al. "Quantitative analysis of cell adhesion on aligned micro- and nanofibers," Feb. 2008, Journal of Biomedical Materials Research Part A, 84(2), pp. 291-299.
Tong, H., et al., "Electrospinning of Fibrous PHBV Tissue Engineering Scaffolds: Fiber Diameter Control, Fiber Alignment and Mechanical Properties," International Conference on Information Technology and Applications in Biomedicine, 2008, pp. 535-538.
Vasita, R., et al., "Nanofibers and their applications in tissue engineering," International Journal of Nanomedicine 2006, vol. 1, pp. 15-30.
Ziabari, M., et al., "A New Image Analysis Based Method for Measuring Electrospun Nanofiber Diameter," Nanoscale Research Letters, vol. 2, (2007) pp. 597-600.
Ziabari, M., et al., "Evaluation of electrospun nanofiber pore structure parameters," Korean Journal of Chemiacal Engineering, vol. 25, No. 4 (2008), pp. 923-932.
Ziabari, M., et al., "Simulated image of electrospun nonwoven web of PVA and corresponding nanofiber diameter distribution," Korean J. Chem. Eng, 2008, vol. 25, pp. 919-922.
"Image J", downloaded on Aug. 6, 2013 from http://rsbweb.nih.gov/ij, 1 page.
Gonsalves, K., et al., Development of Nanostructures for Drug Delivery Applications, *Biomedical Nanostructures*, 2007, Wiley, pp. 145-152.
Palsson, B.Q. et al., Tailoring Biomaterials, 2003, Chapter 16, Pearson Education, pp. 270-287.
Sudeepa, "Three dimensional geometric assessment of the stomach through analysis of Magnetic Resonance Images," (Thesis) May 2008, Department of Biological Sciences and Bioengineering, Indian Institute of Technology, Kanpur, 145 pp.

\* cited by examiner

IMAGE BASED STRUCTURAL CHARACTERIZATION OF FIBROUS MATERIALS

CROSS-REFERENCE TO RELATED APPLICATIONS

This application claims priority to Indian Patent Application Serial No. 1287/DEL/2010 filed Jun. 2, 2010, the contents of which are incorporated by reference herein in its entirety.

BACKGROUND

Structural characterization of fibrous materials is required for a variety of applications such as life sciences, tissue engineering and textile engineering. One method of characterizing the fibers of such fibrous materials is through images of the material obtained by Scanning Electron Microscopy (SEM). However, such images provide only a qualitative assessment of structural properties of the fibers and are unable to provide quantitative estimates of parameters such as diameter and alignment of individual fibers.

Typically, manual measurement of width of fibers is performed in the images obtained through scanning electron microscopy to estimate the diameter of the fibers. However, such manual measurements are time consuming and may be prone to human errors thereby providing inaccurate results. One way of measuring alignment of fibers is through image analysis of Fourier transform of SEM images. However, this technique provides information regarding overall alignment of a selected area but is unable to provide individual angle distribution for each fiber and their curvature.

Further, such measurement techniques are limited to characterization of fibrous materials with large diameter fibers and are not able to characterize materials with small diameter (e.g., nanometer scale) fibers. Moreover, such techniques are unable to characterize and track individual fibers of materials when such fibers are randomly oriented, are curved and are intertwined within the material.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, a method for characterizing a fibrous material having a plurality of fibers is provided. The method includes accessing an image of the fibrous material with the plurality of fibers and identifying each of the plurality of fibers based upon a magnitude and a direction of an intensity gradient of the image. The method also includes tracking each of the identified fibers based upon at least one of a diameter of the fiber, a fiber alignment angle and a vector orientation angle of the fiber and estimating a plurality of structural parameters for each of the tracked fibers of the fibrous material.

In accordance with another aspect, a method for characterizing a fibrous material having a plurality of fibers is provided. The method includes accessing an image of the fibrous material with the plurality of fibers, detecting edges of the plurality of fibers based upon a magnitude and a direction of an intensity gradient of the image and scanning the detected edges using a plurality of horizontal, vertical and directional scan vectors. The method also includes identifying each of the plurality of fibers based upon the intensity gradient of the fibers and the scan vectors and determining tracking points and a tracking direction for each of the identified fibers based upon at least one of a diameter of the fiber, a fiber alignment angle and a vector orientation angle of the fiber. The method further includes estimating a plurality of structural parameters for each of the tracked fibers of the fibrous material.

In accordance with another aspect, a system for characterizing a fibrous material having a plurality of fibers is provided. The system includes a memory configured to store at least one image of the fibrous material and a processing circuit configured to process the at least one image to characterize the plurality of fibers. The processing circuit further includes a fiber identification module configured to identify each of the plurality of fibers based upon a magnitude and a direction of an intensity gradient of the image and a fiber tracking module configured to track each of the identified fibers based upon at least one of a diameter of the fiber, a fiber alignment angle and a vector orientation angle of the fiber.

DETAILED DESCRIPTION

Figure 1:
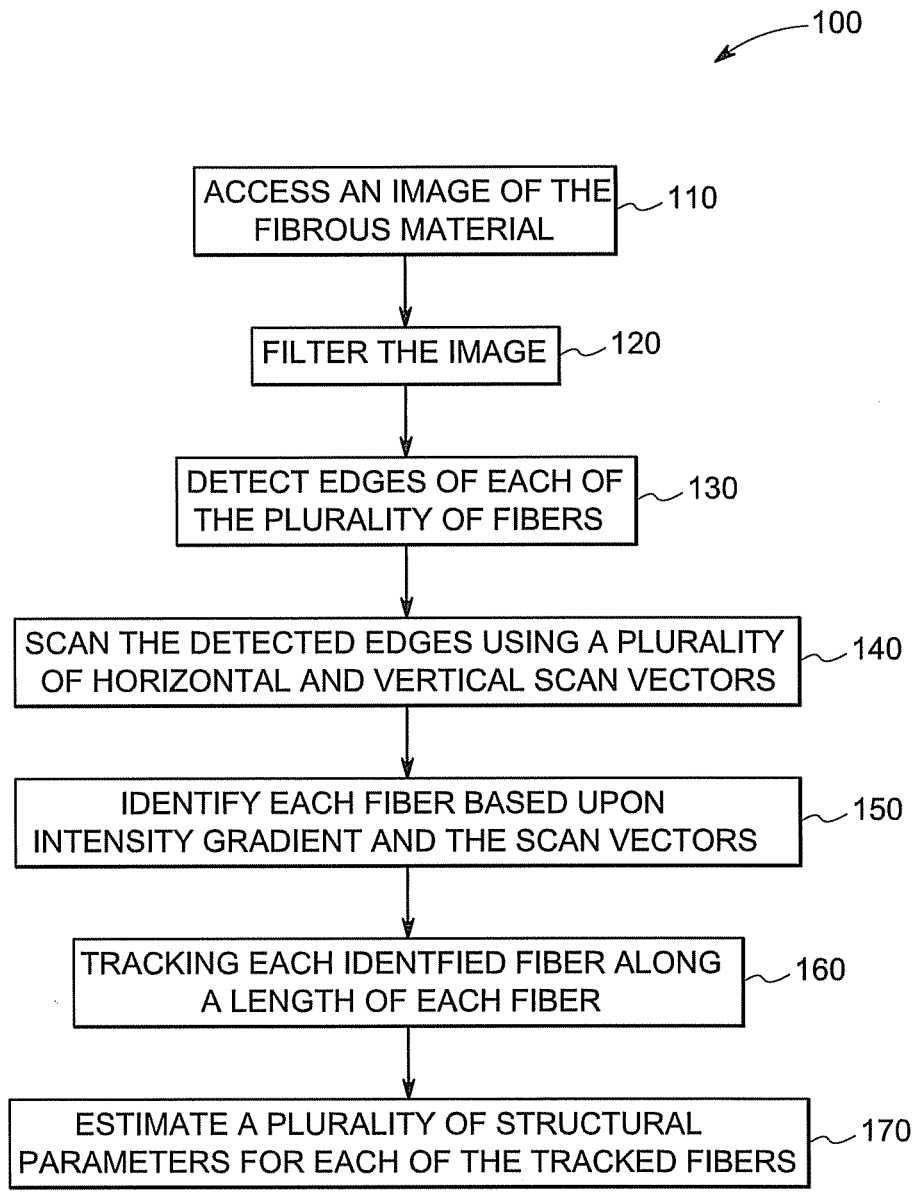
FIG. 1 is an example flow diagram of an embodiment of a method for characterizing a fibrous material.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Example embodiments are generally directed to characterization of fibrous materials. Such techniques may be useful in identifying and characterizing individual fibers of the material required for a variety of applications such as life sciences, tissue engineering, filtration technologies and textile engineering. In particular, the technique employs analysis of images of the fibrous material to estimate structural parameters of individual fibers even when the fibers are randomly oriented, curved or intertwined.

Referring now to FIG. 1, an example flow diagram 100 of an embodiment of a method for characterizing a fibrous material is illustrated. At block 110, an image of the fibrous material is accessed. The fibrous material includes a plurality of fibers. In certain embodiments, the image of the fibrous material may be obtained using an image acquisition device such as a scanning electron microscope. Further, the image may be filtered to remove any noise in the image to generate a filtered image (block 120).

At block 130, edges of each of the plurality of fibers are detected. In this example embodiment, the edges are detected based upon a magnitude and a direction of an intensity gradient of the filtered image. In one embodiment, the edges are identified based upon a peak intensity gradient of the filtered image. It should be noted that a variety of known edge detection techniques may be employed for detection of edges of each fiber. For example, Canny edge detection operator may be applied to the filtered/unfiltered image for detecting the edges.

Moreover, the detected edges are scanned using a plurality of horizontal and vertical scan vectors (block 140). As used herein, the term "scan vectors" refers to scan lines utilized for detecting the edges of the fibers. In certain embodiments, diagonal and/or directional scan vectors may also be employed for scanning the edges. In this embodiment, the edges are scanned in vertical, horizontal, diagonal or directional directions for fibers making an angle lesser and greater than 45 degrees respectively.

In this exemplary embodiment, fibers making an angle (with x axis of the image) between about 0 degrees and about 60 degrees & between about 120 degrees and 180 degrees are identified by vertical scans. Furthermore, fibers making an angle between about 30 degrees and about 150 degrees are identified by horizontal scans. As a result, an overlap angle area is generated where fibers will be selected by both the scan paths thereby enhancing accuracy in the fiber identification.

In certain embodiments, a number of the vertical, horizontal, diagonal and directional scans may be configurable by a user. At block 150, the individual fibers are identified based upon the intensity gradient and the horizontal/vector scan vector corresponding to the respective fiber. In certain embodiments, the fibers are identified based upon an angle between the intensity gradient and the scan vector.

Further, each identified fiber is tracked along a length of the fiber in a direction perpendicular to the intensity gradient (block 160). In certain embodiments, where an initial tracking point provided by the scan vectors is in the middle of the fiber, the tracking is carried out in either directions of the tracking point until the edge of the fiber is reached or lost.

In this embodiment, tracking points and a tracking direction is determined for each of the identified fibers. The tracking points may be identified using the angle between the intensity gradient and the scan vector as described above. Further, such points are validated based upon at least one of a diameter of the fiber, a fiber alignment angle and a vector orientation angle of each fiber. As used herein, the term "vector orientation angle" refers to angle between a vector joining two adjacent tracking points of the fiber and a horizontal axis. Further, the term "fiber alignment angle" refers to a fiber's angle with a horizontal coordinate axis. In certain embodiments, the fiber alignment angle value is between −90 degrees and +90 degrees. In certain other embodiments, the fiber alignment angle value is between 0 degrees and 180 degrees.

At block 170, a plurality of structural parameters for each of the tracked fibers are estimated. Examples of the structural parameters include, but are not limited to, a diameter of the fiber, a length of the fiber, a gradient of the fiber, surface area of the fiber, an angle of the fiber relative to coordinate axes, coordinates information of edge points of the fiber and coordinate information of a midpoint of the fiber.

Figure 2:
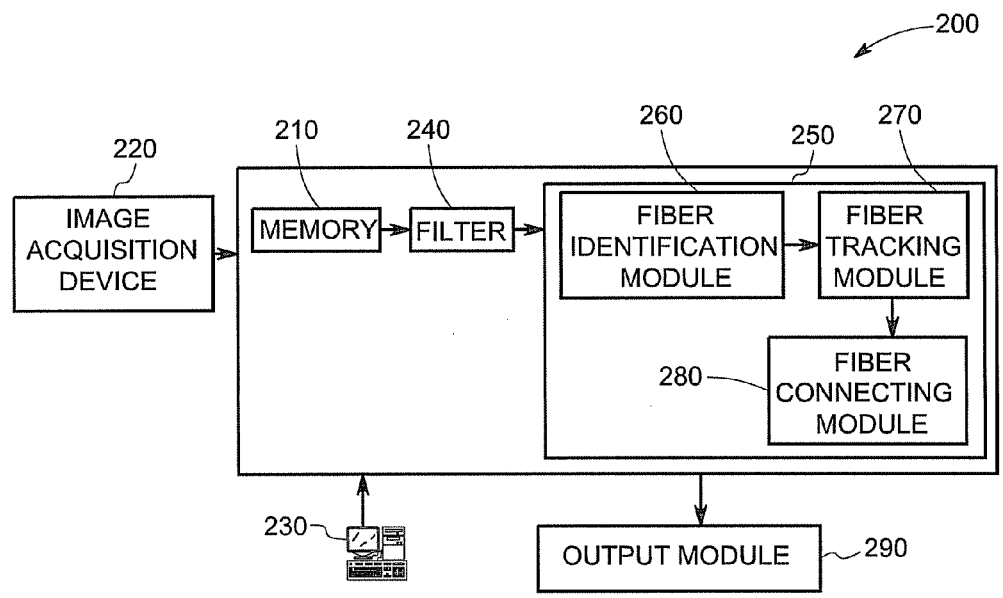
FIG. 2 is an illustrative embodiment of an example system for characterizing a fibrous material.

FIG. 2 illustrates an example system 200 for characterizing a fibrous material. The image system 200 includes a memory 210 configured to store at least one image of the fibrous material. The input image may be obtained using an image acquisition device 220 and stored in the memory 210 for characterization of the fibrous material.

The memory 210 may include hard disk drives, optical drives, tape drives, random access memory (RAM), read-only memory (ROM), programmable read-only memory (PROM), redundant arrays of independent disks (RAID), flash memory, magneto-optical memory, holographic memory, bubble memory, magnetic drum, memory stick, Mylar® tape, smartdisk, thin film memory, zip drive, and so forth.

It should be borne in mind that, although a single memory is described here, the storing function may be performed by more than one memory devices associated with the system for storing image processing routines, input images, and so forth.

In the illustrated embodiment, the system 200 further includes a user interface 230 configured to load the at least one image in the system 200 and to provide input parameters for processing the at least one image. Examples of the input parameters include, but are not limited to, pre-determined range for diameter of the fibers to be tracked, thresholds for diameter of fibers and fiber alignment angles for identifying the fibers and a number of scans for tracking the fibers. In certain embodiments, the user interface 230 is configured to display the at least one image on a user-defined axis.

Moreover, the system 200 includes a filter 240 coupled to the memory 210 and configured to filter the at least one image to generate a filtered image. In the illustrated embodiment, the filter 240 includes a low-pass Gaussian filter. However, a variety of other filters may be envisaged. The filtered image is subsequently processed by a processing circuit 250 to characterize the plurality of fibers of the fibrous material. In the illustrated embodiment, the processing circuit 250 includes a fiber identification module 260 configured to identify the each of the plurality of fibers. Further, the processing circuit 250 includes a fiber tracking module 270 configured to track each of the identified fibers of the fibrous material.

The fiber identification module 260 is configured to detect the edges of the fibers based upon the magnitude and direction of the intensity gradient of the image. In operation, the non-maxima edge points of the fibers are suppressed to detect the valid edges of each fiber. In one example embodiment, Canny edge detector is employed to detect the edges by suppressing the non-maxima edge points.

In certain embodiments, false edges having a relatively low intensity gradient may be detected during the edge detection process. Such false edges may be removed based upon a pre-determined intensity gradient threshold. In one example embodiment, the threshold is calculated using Otsu's auto thresholding technique. In certain other embodiments, the threshold may be specified by a user of the system 200. Edges having intensity gradient magnitude below the threshold may be considered as false edges and are removed from the analysis.

The fiber identification module 260 is configured to perform a plurality of horizontal and vertical scans of the detected edges and to determine edge points for each fiber. Each of the plurality of fibers is identified based upon the intensity gradients and scan vectors employed for performing the scans. Moreover, the fiber tracking module 270 is configured to track a trajectory of each identified fiber based upon the intensity gradient and tracking points identified by the fiber identification module 260.

In certain embodiments, the fiber tracking module 270 is configured to validate uniqueness of tracking points of each of the plurality of fibers. In one example embodiment, a tracking matrix may be generated by the fiber tracking module 270. As used herein, the term "tracking matrix" refers to a blank matrix that is updated with information of fibers as they are tracked and is utilized to validate uniqueness of each tracking point of the corresponding fiber. The tracking matrix may be of substantially the same size as the original image of the fibrous material. The pixels of the tracking matrix corresponding to each fiber's midline points may be assigned a value of 0 or 1 for un-tracked and tracked points respectively. Thus before tracking of each fiber, the corresponding pixels in the tracking matrix are verified to avoid repetitive tracking of the fibers.

The tracking matrix facilitates avoiding repetitive tracking of fibers due to multiple starting points provided by multiple scan vectors. In one example embodiment, the tracking matrix includes information such as diameter and gradient of fiber at each midline pixel stored in parallel matrices referred to as accumulation matrices. In certain embodiments, the tracking matrix may be stored in the memory 210 of the system 200.

The fiber tracking module 270 is configured to determine tracking points and the tracking direction for each identified fiber. The tracking points for each fiber are validated based upon the diameter of the fiber, fiber alignment angle and the vector orientation angle of the respective fiber. The tracking of each fiber is performed using the validated tracking points. In this embodiment, the tracking direction of each identified fiber is determined using gradient of edge points of the respective fiber. From the start point, the fiber is extended in two opposite directions and the fiber tracking module 270 is configured to track the fiber in these directions. In this example embodiment, the fiber tracking module 270 is further configured to identify partially and completely tracked fibers of the fibrous material.

In particular, the fiber tracking module 270 estimates a minimum distance from the boundary of the image while the fiber maintains substantially the same angle with the x-axis as that of the last stored tracking point. The estimated distance may be compared to a threshold to determine if the fiber is partially or completely tracked. In one example embodiment, the threshold is about five times of the diameter of the respective fiber. If the distance is more than the threshold, the fiber is identified as a partially tracked fiber.

In certain embodiments; the partially tracked fibers may be connected using diameter and gradient at end points of such fibers via a fiber connecting module 280. Subsequently, the processing circuit 250 estimates a plurality of structural parameters for each of the tracked fibers. Such parameters are displayed via an output module 290 of the system 200.

Figure 3:
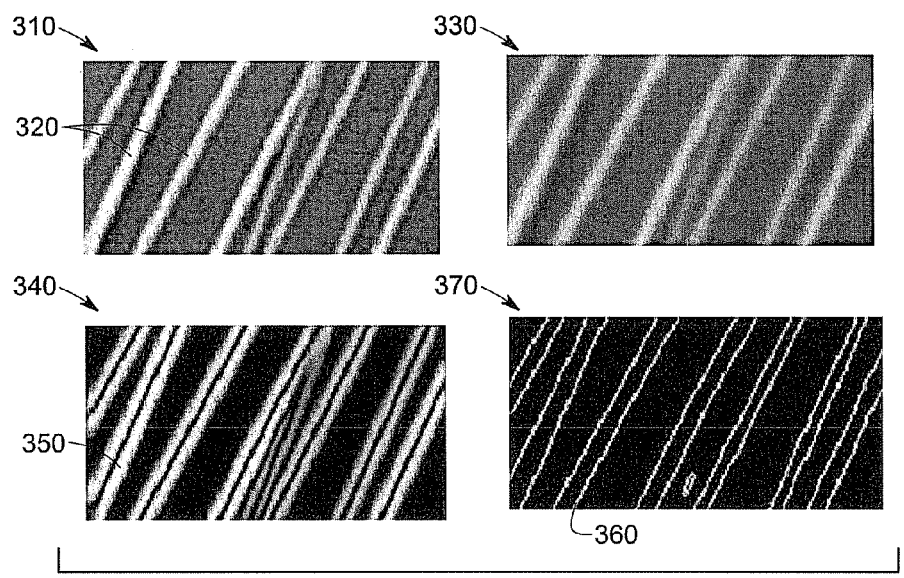
FIG. 3 illustrates example images of a fibrous material processed using the system of FIG. 2

FIG. 3 illustrates example images 300 of a fibrous material processed using the system 200 of FIG. 2. In the illustrated embodiment, an input image of a nano-fibrous material obtained using a Scanning Electron Microscope is represented by reference numeral 310. The nano-fibrous material includes a plurality of fibers such as represented by reference numeral 320. Further, the image obtained by applying a filter to the input image 310 is represented by reference numeral 330. In the illustrated embodiment, a low pass Gaussian filter is employed to remove the noise in the input image 310 and to generate the filtered image 330.

Moreover, image 340 represents magnitude of an image intensity gradient of the filtered image 330. As illustrated, the image intensity gradient of the filtered image 330 characterizes edges such as represented by reference numeral 350 of the fibers of the fibrous material. In this example embodiment, Canny edge detection operator without the thresholding step is applied to the image 340 to convert multi-pixel blurry edges 350 to sharp single pixel edges 360, as represented in an example image 370. Typically, the Canny edge detection operator includes hysteresis/double thresholding employed after non-maxima suppression for removing false edges and to connect broken edges. In this example embodiment, the hysteresis/double thresholding is replaced by an autothreshold technique that will be described below.

Figure 4:
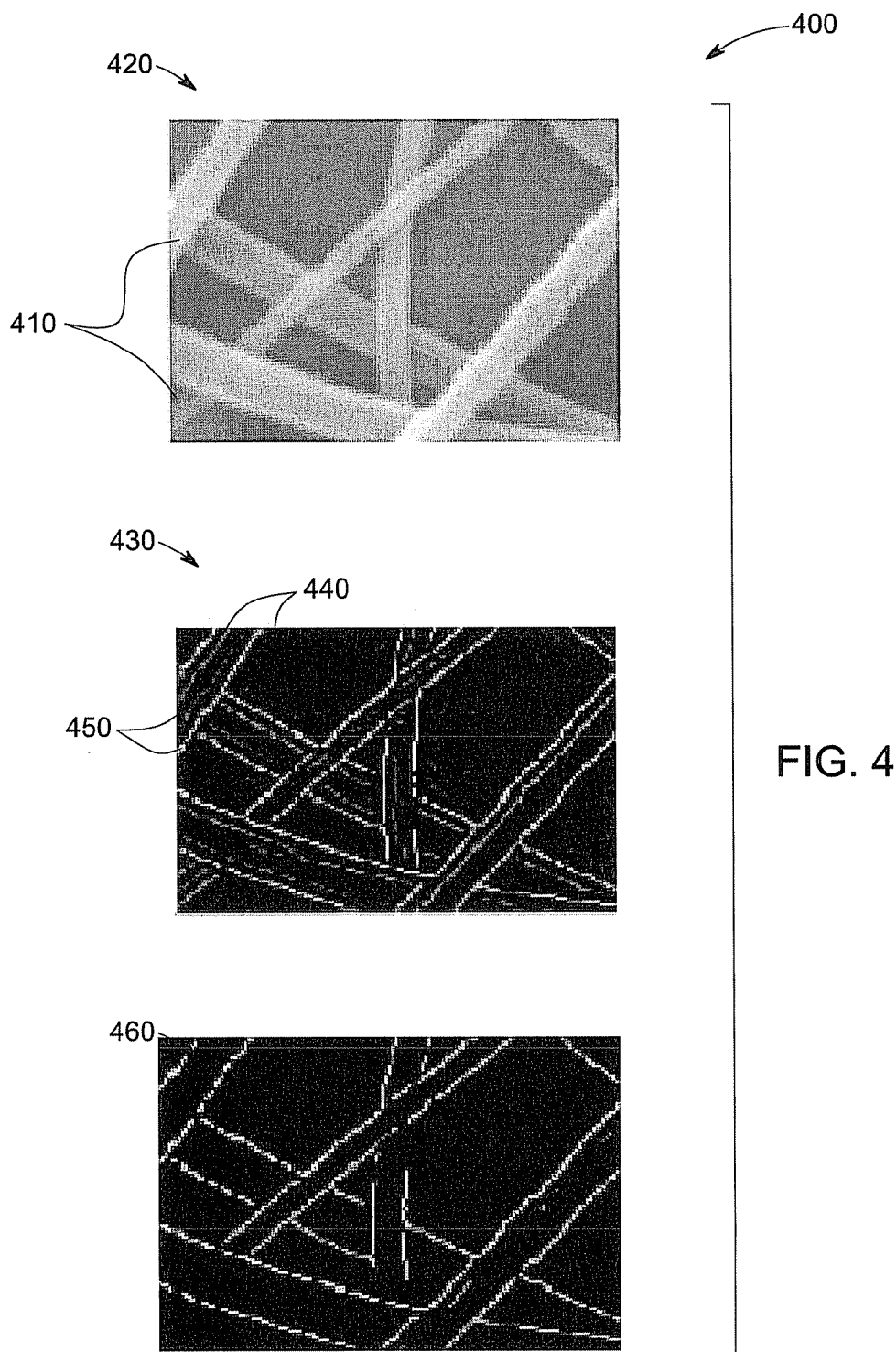
FIG. 4 illustrates example images of a fibrous material processed using the system of FIG. 2 for removing false edges of the fibers.

FIG. 4 illustrates example images 400 of a fibrous material processed using the system 200 of FIG. 2 for removing false edges of the fibers. In the illustrated embodiment, an input image of a fibrous material with fibers 410 is represented by reference numeral 420. Further, an image 430 represents the image generated by applying Canny edge detection operator to the input image 420. As described above, the Canny edge detection operator converts blurry edges to sharp single pixel edges such as represented by reference numeral 440.

The image 430 may include true edges 440 of the fibers 410. Further, the image 430 may also include false edges such as represented by reference numeral 450. Such false edges 450 have a relatively low image intensity gradient as compared to the intensity gradient of the true edges 440. In the illustrated embodiment, an intensity gradient threshold is estimated using Otsu's auto thresholding technique. Further, such threshold is utilized to remove the false edges 450 in an output image 460.

Figure 5:
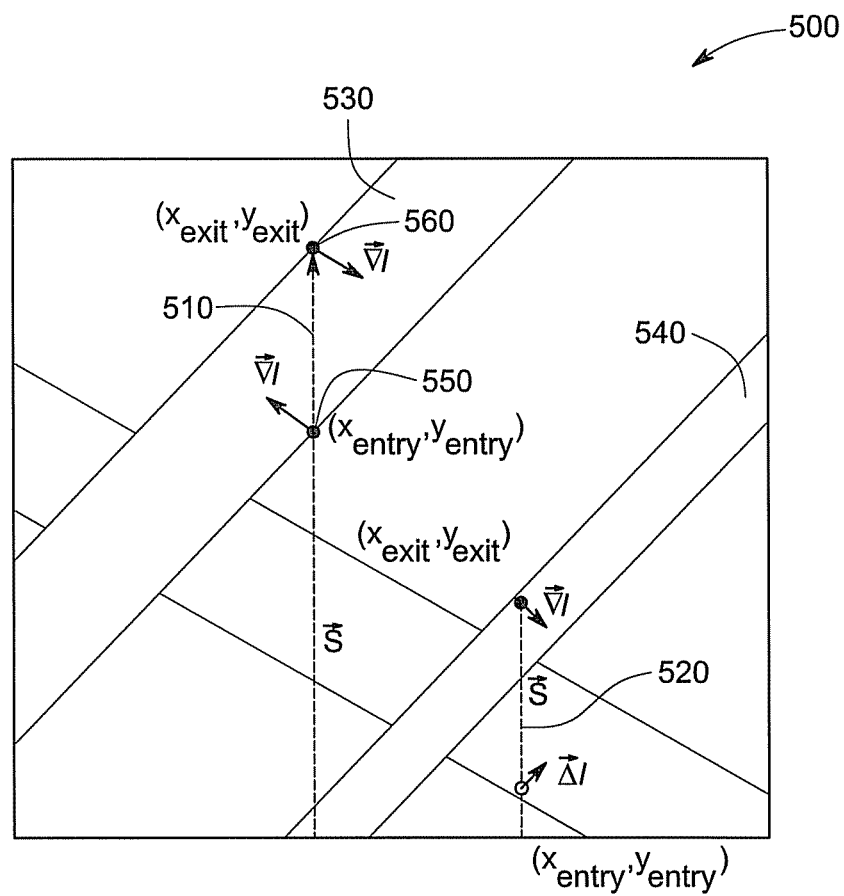
FIG. 5 illustrates an example image with scan vectors for identifying fiber edges using the system of FIG. 2.

FIG. 5 illustrates an example image 500 with scan vectors 510 and 520 for identifying edges of identified fibers using the system of FIG. 2. As illustrated, the image 500 of a fibrous material having fibers such as represented by reference numerals 530 and 540 may be scanned in vertical and horizontal directions. In the illustrated embodiment, the image 500 is an image generated by filtering an input image and applying the Canny edge detection operator for identifying the edges. In the illustrated embodiment, an entry point 550 and an exit point 560 for the fiber 530 are determined based upon the magnitude and direction of the image intensity gradient. As illustrated, the exit point 560 is the point identified on the opposite boundary of the fiber 530. In this example embodiment, the fibers 530 and 540 are relatively brighter than a background of the image 500.

In the illustrated embodiment, scanning is performed from bottom to top of the image 500 using the scan vector 510. The scan vector 510 enters the fiber 530 at the entry point 550 wherein the Canny edge detection operator identifies a local peak in the intensity gradient magnitude. In addition, the image gradient makes an acute angle with the scan vector 510, as represented by the following relationship:

$$f[\vec{S}, \vec{\nabla} I(x_{entry}, y_{entry})] > 0 \quad (1)$$

where: f=1 for fibers brighter than background and f=−1 for fibers darker than background, $\vec{S}$ is the scan vector; and $\vec{\nabla} I(x_{entry}, y_{entry})$ is the intensity gradient at the entry point 550.

Furthermore, the scan vector 510 exits the fiber 530 at the exit point 560 wherein the Canny edge detection operator identifies a local peak in the intensity gradient magnitude. In addition, the image gradient makes an obtuse angle with the scan vector 510, as represented by the following relationship:

$$f[\vec{S}, \vec{\nabla} I(x_{exit}, y_{entry})] < 0 \quad (2)$$

Where: $\vec{\nabla} I(x_{exit}, y_{exit})$ is the intensity gradient at the exit point 560.

In certain embodiments, fibers may be checked for anti-parallelism between image gradients at entry and exit points to prevent incorrect identification of fibers such as represented by reference numeral 540. Such fibers may be identified due to overlapping fibers in the fibrous material. In one embodiment, the anti-parallelism may be verified in accordance with the following relationship:

$$-\frac{\vec{\nabla} I(x_{entry}, y_{entry}), \vec{\nabla} I(x_{exit}, y_{exit})}{\left|\vec{\nabla} I(x_{entry}, y_{entry})\right|\left|\vec{\nabla} I(x_{exit}, y_{exit})\right|} \geq 0.9 \quad (3)$$

Thus, fibers complying with each of the relationships defined by the equations (1)-(3) above are identified and tracked for estimating the structural parameters of the respective fiber.

It should be noted that the relationships defined above may be reversed for an image where the fibers 530 and 540 are relatively darker than the background of the image 500. The relationships for such a condition are defined by the following equations:

$$f[\vec{S}, \vec{\nabla} I(x_{entry}, y_{entry})] < 0 \quad (4)$$

$$f[\vec{S}, \vec{\nabla} I(x_{exit}, y_{exit})] > 0 \quad (5)$$

$$-\frac{\vec{\nabla} I(x_{entry}, y_{entry}), \vec{\nabla} I(x_{exit}, y_{exit})}{\left|\vec{\nabla} I(x_{entry}, y_{entry})\right|\left|\vec{\nabla} I(x_{exit}, y_{exit})\right|} \leq 0.9 \quad (6)$$

Figure 6:
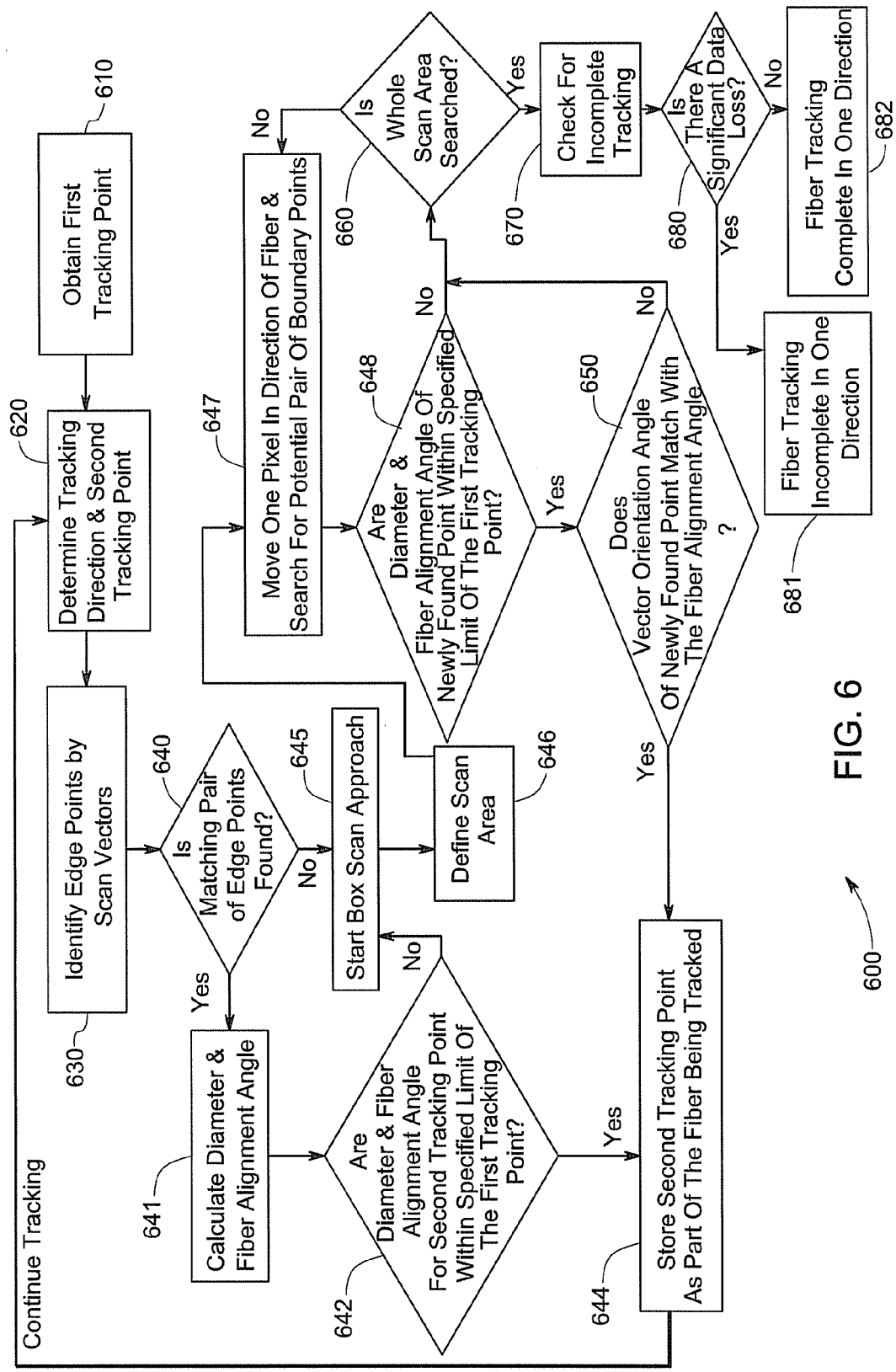
FIG. 6 illustrates an example flow diagram of an embodiment of a method for tracking the identified fibers of the fibrous material.

FIG. 6 illustrates an example flow diagram 600 of an embodiment of a method for tracking the identified fibers of a fibrous material. At block 610, a first tracking point and a tracking direction is obtained for each fiber of the fibrous material. The first tracking point may be determined using the image gradient magnitude and direction as described above. In this example embodiment, the first tracking point is identified by determining a mid point of pair of entry and exit edge points. Further, the tracking direction is generally perpendicular to direction of gradient at the tracking point.

At block 620, a tracking direction and a second tracking point adjacent to the first tracking point is determined. In certain embodiments, the second tracking point is determined by moving a jump distance from the first tracking point thereby reducing the computational time and complexity of the system. In this example embodiment, the jump distance is selected such that after covering the jump distance, the function is still on the same fiber. In certain embodiments, the jump distance is selected as the diameter of the previous stored point.

Further, at block 630, edge points are identified on the image using the scan vectors and localized gradients are calculated as described above with reference to FIG. 5. In this example embodiment, the edge points may be searched in the vertical, horizontal, or any arbitrary directions by the fiber identification module 270. For example, if while moving in the vertical direction if a top edge point and a bottom edge point are identified then matching pair of edge points are identified as described below.

At block 640, it is determined if a matching pair of edge points is identified. If the matching pair of edge points is identified, then diameter and fiber alignment angle for the second tracking point is calculated (block 641). At block 642, it is verified if the diameter and the fiber alignment angle for the second tracking point are within specified limits relative to the previous tracking point. In one example embodiment, the specified limits for the diameter and the fiber alignment angle are about 20% and 10% respectively. However, other user-defined threshold ranges for the diameter and the fiber alignment angle may be envisaged. At block 644, the tracking point is stored as part of the fiber being tracked if the diameter and the fiber alignment angles are within the specified limits.

If the matching pair of edge points is not detected, then a box scan technique for identifying the second tracking point is initiated (block 645). The box scan technique will be described in a greater detail below with reference to FIG. 7. In certain embodiments, the box scan technique is also initiated if the diameter and the fiber alignment angles are not within the pre-determined threshold ranges (block 642). At block 646, a scan area is defined. In one example embodiment, the scan area is about two times of the square of diameter of the fiber at the first tracking point.

At block 647, a potential second tracking point is determined by moving pixel-by-pixel within the scan area. At each pixel within the scan area, it is verified if the diameter and the fiber alignment angle of newly found point are within specified limits relative to the first tracking point (block 648).

If the diameter and the fiber alignment angles are within the pre-determined threshold ranges, a vector orientation angle for the newly found point is compared with the fiber alignment angle (block 650). The vector orientation angle is estimated by determining the angle between a vector joining the tracking point with the first tracking point and the horizontal axis. If the vector orientation angle is substantially the same as the fiber alignment angle, the corresponding point is stored as the second tracking point (block 644).

If the diameter and/or the fiber alignment angle for the tracking point are not within the pre-determined threshold ranges or the vector orientation angle is different than the fiber alignment angle, then it is verified if the full scan area has been tracked for determining the tracking point (block 660). If the full scan area has been tracked then the respective fiber is verified for complete/partial tracking (block 670). The data loss for any tracking points is checked at block 680, which is representative of incomplete or complete tracking as represented by reference numerals 681 and 682 respectively.

Figure 7:
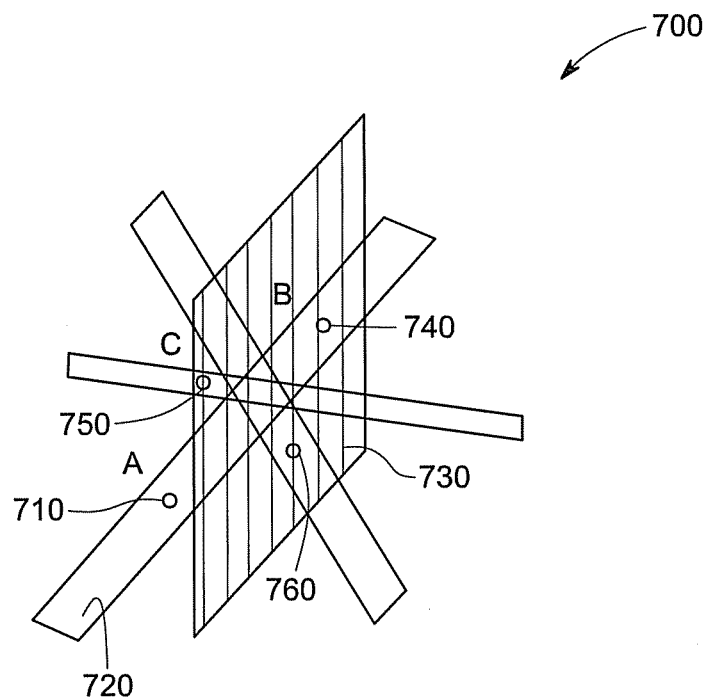
FIG. 7 illustrates example configuration of fibers tracked using box scan technique.

FIG. 7 illustrates example configuration 700 of fibers tracked using the box scan technique. In this example embodiment, a first tracking point represented generally by 710 is identified on a fiber 720. Further, a scan area 730 is searched to identify the second tracking point. In this example embodiment, each of points 740, 750 and 760 is detected as a potential second tracking point within the scan area 730. In this example embodiment, point 740 that complies with the diameter and fiber alignment angle conditions described above is validated as the second tracking point while the other two points 750 and 760 are removed from the analysis.

Figure 8:
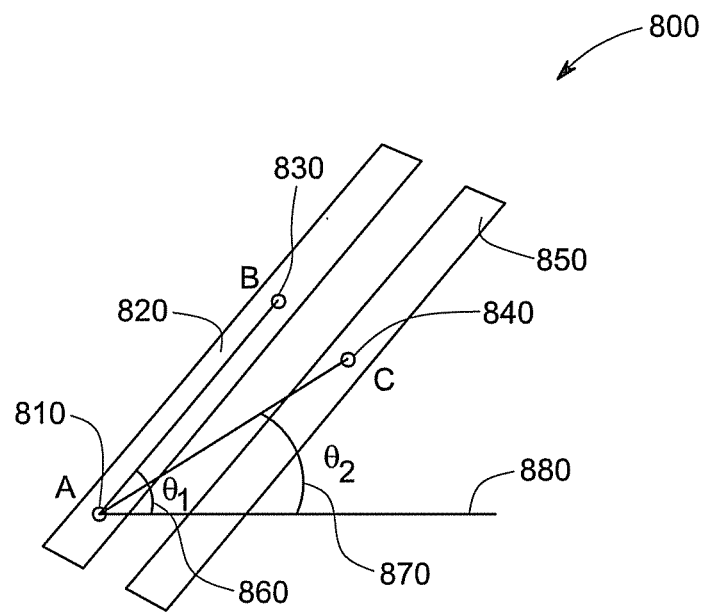
FIG. 8 illustrates example configuration of fibers tracked using vector orientation angle.

FIG. 8 illustrates example configuration 800 of fibers in which a tracked point is verified using vector orientation angle. In this example embodiment, a first tracking point represented generally by 810 is identified on a fiber 820. Further, each of points 830 and 840 is detected as a potential second tracking point using the box scan technique described above with reference to FIG. 7. As can be seen, the point 840 lies on a different fiber 850 of the fibrous material.

In this example embodiment, vector orientation angles $\theta_1$ and $\theta_1$ generally represented by reference numerals 860 and 870 are estimated with respect to a horizontal axis 880. As can be seen, the vector orientation angle 860 ($\theta_1$) is substantially same as the orientation of the fiber 820 thereby validating point 830 as the second tracking point. In contrast, the vector orientation angle 870 ($\theta 2$) is different than the orientation of the fiber 820. As a result, the point 840 is removed from the tracking path of the fiber 820. In certain embodiments, a user-configurable threshold is defined for the difference between the respective vector orientation angles of fibers for removing false tracking points. In one example embodiment, the threshold is about 15%.

The tracking of each fiber is performed by determining the tracking points as described above. In certain embodiments, partially tracked fibers are identified and are connected using diameter, gradients and vector orientation angles at end points of such fibers. Furthermore, structural parameters are estimated for each of the tracked fibers. The structural parameters include diameter of the fiber, a length of the fiber, a gradient of the fiber, surface area of the fiber, an angle of the fiber relative to coordinate axes, coordinate information of edge points of the fiber and coordinate information of a midpoint of the fiber.

In certain embodiments, the structural parameters may be utilized to determine intra-fiber and inter-fiber statistics for each of these parameters. For example, profiles for parameters such as diameter, angle with x-axis, length, curvature and surface area for each fiber may be generated using the corresponding estimated parameters for each tracking point along the fiber. Moreover, distribution profiles for parameters such as diameter and angle with x-axis may be generated using the corresponding parameter data for all tracked fibers of the fibrous material. Such information may be helpful in determining global variation in structural parameters of the material.

The example methods and systems described above facilitate identification and tracking of individual fibers of a fibrous material and estimation of structural parameters of such fibers.

The characterization technique described above may be utilized in a variety of applications such as for controlling manufacturing processes of polymeric electrospun micro and/or nano fibers used for filtration, among other applications. The technique may be integrated with a variety of other measurement techniques such as utilized by scanning electron microscopes and other similar devices to facilitate automatic tracking of fibers and structural parameter estimates.

Further, the technique may also be used for characterization of fibers in textile industries as well as characterizing electrospun nanofibers employed in biomaterials and tissue engineering applications. Typically, fibrous proteins present in the extracellular matrix of tissues such as collagen and fibronectin facilitate regulation of cell fate processes. Further, the polymeric nanofibers may be employed to mimic the fibrous proteins when provided as scaffolding systems. The technique described above may be employed to determine physical properties of fibrous proteins/micro-nano fibers used to mimic them including diameter, length, curvature, and alignment, which in turn, are utilized to regulate the cell fate processes.

In addition, the technique described above may be utilized to characterize a variety of fibrous materials such as fiber reinforced composites, nanowires, carbon nanotubes, among others.

As will be appreciated by those of ordinary skill in the art, the foregoing example, demonstrations, and process steps may be implemented by suitable code on a processor-based system. It should also be noted that different implementations of the present technique may perform some or all of the steps described herein in different orders or substantially concurrently, that is, in parallel.

Furthermore, the functions may be implemented in a variety of programming languages, such as C++ or JAVA. Such code, as will be appreciated by those of ordinary skill in the art, may be stored or adapted for storage on one or more tangible, machine readable media, such as on memory chips, local or remote hard disks, optical disks (that is, CDs or DVDs), or other media, which may be accessed by a processor-based system to execute the stored code.

Figure 9:
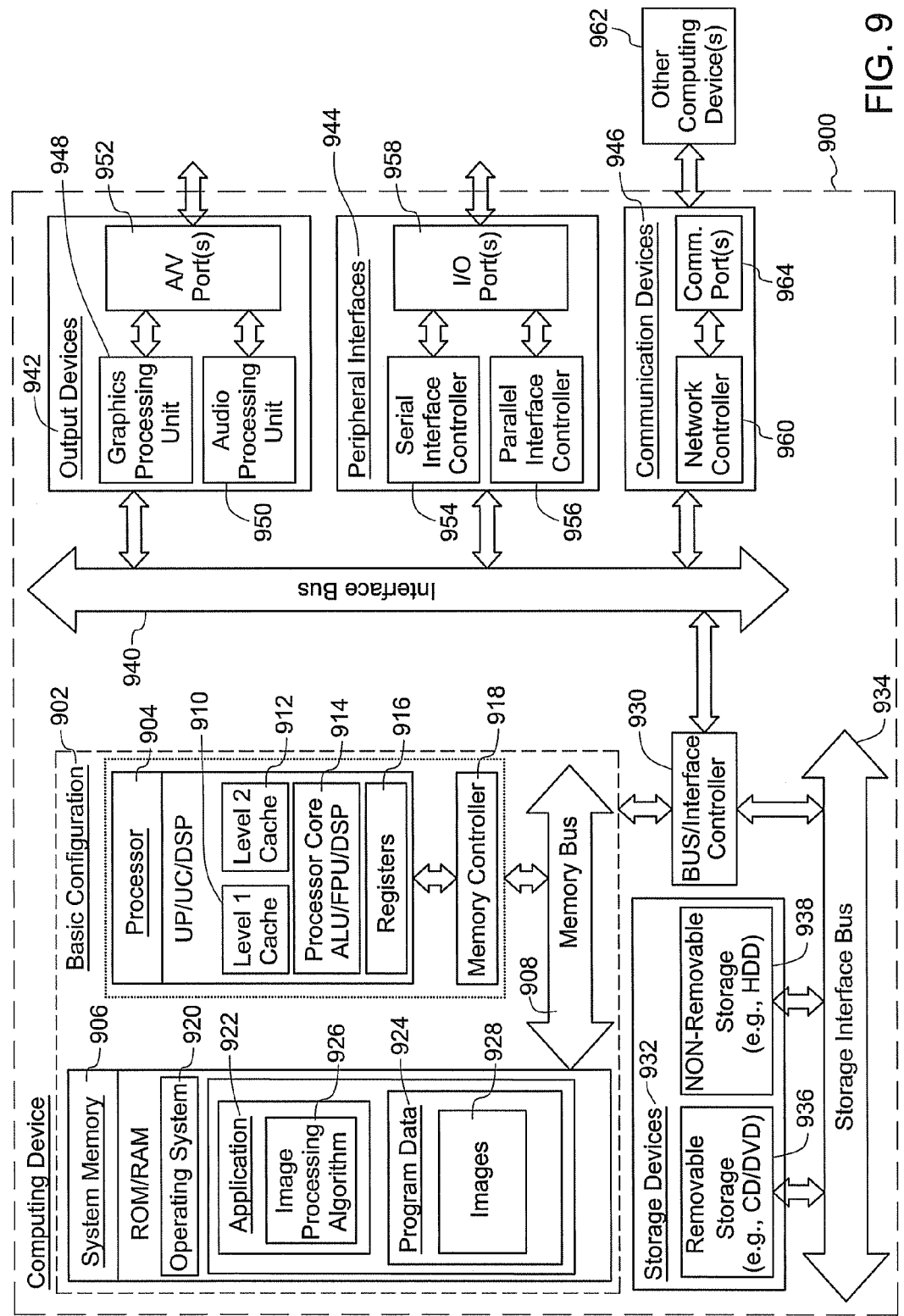
FIG. 9 is a block diagram illustrating an example computing device that is arranged for characterizing a fibrous material in accordance with the present disclosure.
Figure 1:
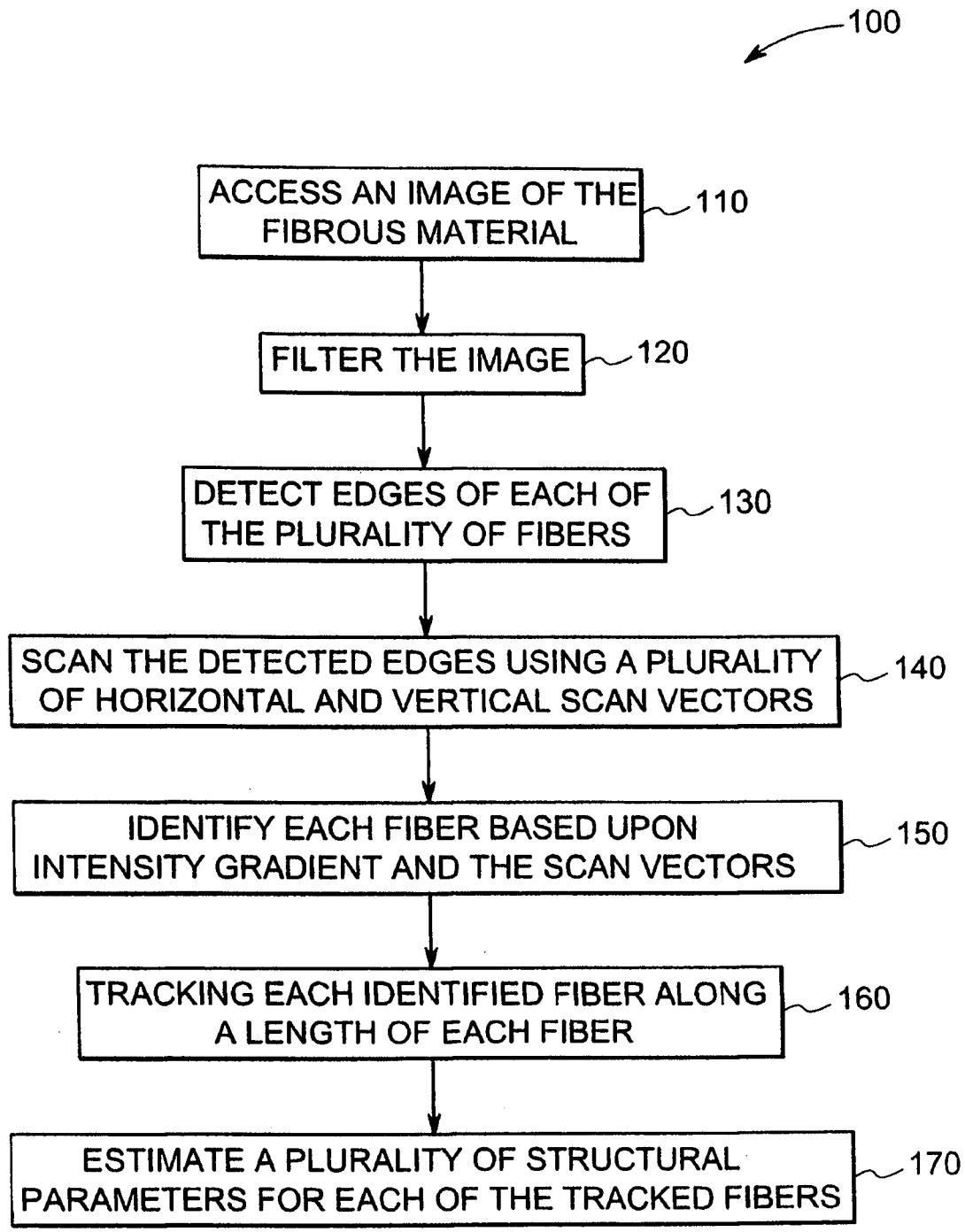
Figure 9:
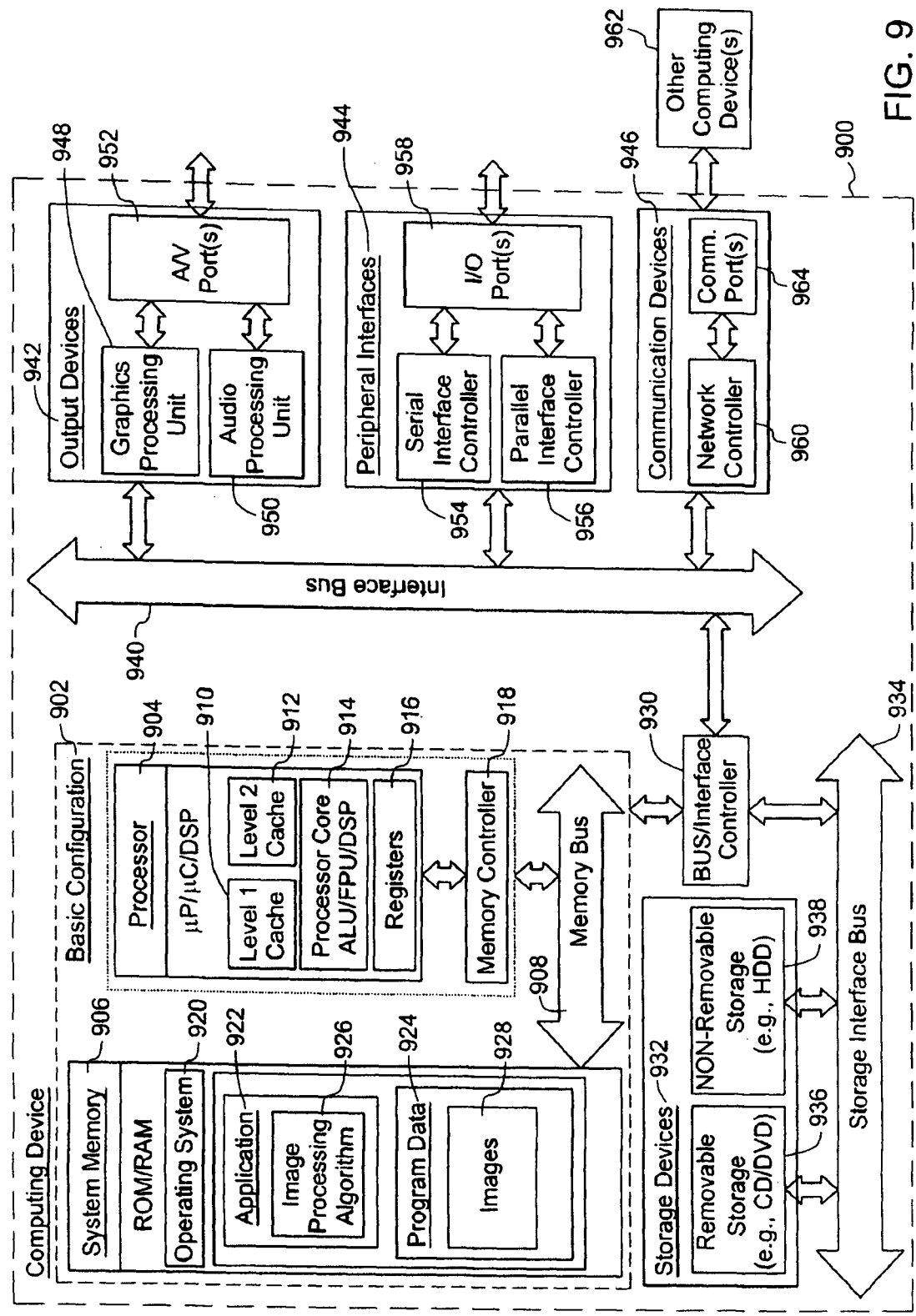

FIG. 9 is a block diagram illustrating an example computing device 900 that is arranged for characterizing a fibrous material in accordance with the present disclosure. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor ($\mu$P), a microcontroller ($\mu$C), a digital signal processor (DSP), or any combination thereof. Processor 904 may include one more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924. Application 922 may include an image processing algorithm 926 that is arranged to perform the functions as described herein including those described with respect to process 100 of FIG. 1. Program data 924 may include images of the fibrous material 928 that may be useful for generating the desired high resolution image as is described herein.

In some embodiments, application 922 may be arranged to operate with program data 924 on operating system 920 such that identification and tracking of fibers of the fibrous material may be performed. This described basic configuration 902 is illustrated in FIG. 9 by those components within the inner dashed line.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952.

Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

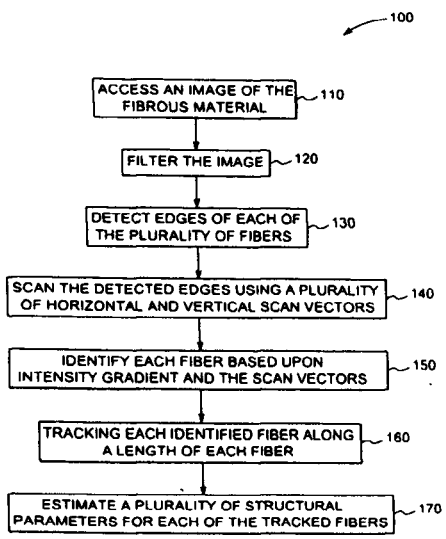

The invention claimed is:

1. A method for characterizing a fibrous material having a plurality of fibers, the method comprising:
    accessing, by a computing device, an image of the fibrous material with the plurality of fibers;
    identifying, by the computing device, each of the plurality of fibers based upon a magnitude and a direction of an intensity gradient of the image;
    tracking, by the computing device, each of the identified fibers based upon at least one of a diameter of the fiber, a fiber alignment angle, and a vector orientation angle of the fiber, wherein the tracking each of the identified fibers comprises comparing a difference in at least the diameter of the fiber, the fiber alignment angle, or the vector orientation angle between two tracking points; and
    estimating, by the computing device, a plurality of structural parameters for each of the tracked fibers of the fibrous material.

2. The method of claim 1, further comprising:
    filtering the image to generate a filtered image;
    detecting edges of each of the plurality of fibers in the filtered image by suppressing non-maxima edge points of the fibers; and
    removing false edges from the detected edges based upon a pre-determined intensity gradient threshold.

3. The method of claim 2, wherein detecting edges of each of the plurality of fibers comprises applying Canny edge detection operator and Otsu's thresholding technique to the filtered image.

4. The method of claim 2, further comprising:
    determining an entry point for each of the plurality of fibers based upon an angle between the intensity gradient of the fiber and a scan vector at the entry point;
    determining an exit point for the corresponding fiber based upon the angle between the intensity gradient of the fiber and the scan vector at the exit point; and
    identifying each of the plurality of fibers based upon the entry and exit points.

5. The method of claim 4, further comprising:
    identifying points from overlapping fibers based upon intensity gradients of the fiber at the entry and exit points; and
    removing the identified points from overlapping fibers.

6. The method of claim 4, further comprising:
    determining tracking directions for each identified fiber based upon the intensity gradient;
    identifying a first tracking point for each identified fiber along each of the tracking directions of each fiber;
    determining a second tracking point adjacent to the first tracking point based upon the angle between the intensity gradient of the fiber and the scan vector at the second tracking point; and
    validating the second tracking point by comparing at least one of the diameter of the fiber, the fiber alignment angle and the vector orientation angle of the fiber corresponding to the second tracking point with respect to the first tracking point.

7. The method of claim 6, further comprising:
    storing the second tracking point;
    using the second tracking point as an initial point for subsequent tracking of the fiber; and
    repeating the determining and validating steps until tracking of the respective fiber is completed.

8. The method of claim 1, wherein tracking each of the identified fibers further comprises:
    identifying partially tracked fibers based upon a distance of each fiber from a boundary of the image; and
    connecting partially tracked fibers using at least one of diameter, fiber angle and gradient of points of the partially tracked fibers.

9. The method of claim 1, wherein the plurality of structural parameters comprise a diameter of the fiber, or a length of the fiber, or a gradient of the fiber, or surface area of the fiber, or an angle of the fiber relative to coordinate axes, or coordinate information of edge points of the fiber, or coordinate information of a midpoint of the fiber, or combinations thereof.

10. A method for characterizing a fibrous material having a plurality of fibers, the method comprising:
    accessing, by a computing device, an image of the fibrous material with the plurality of fibers;
    detecting, by the computing device, edges of the plurality of fibers based upon a magnitude and a direction of an intensity gradient of the image;
    scanning, by the computing device, the detected edges using a plurality of horizontal, vertical and directional scan vectors;
    identifying, by the computing device, each of the plurality of fibers based upon an angle between the intensity gradient of the image and a corresponding scan vector;
    determining, by the computing device, tracking directions and tracking points for each of the identified fibers; and
    estimating, by the computing device, a plurality of structural parameters for each of the tracked fibers of the fibrous material.

11. The method of claim 10, wherein identifying each of the plurality of fibers comprises estimating the angle between the intensity gradient of the image and the corresponding scan vector to determine edge points of each fiber.

12. The method of claim 11, comprising:
    estimating a first angle between the scan vector and the intensity gradient at a first edge point;
    estimating a second angle between the scan vector and the intensity gradient at a second edge point;

storing the first and second edge points as tracking points if the first and the second angles comprise acute and obtuse angles respectively.

13. The method of claim 10, wherein determining the tracking points comprises comparing a difference in at least a diameter of the fiber and a fiber alignment angle between two consecutive tracking points with corresponding pre-determined threshold ranges; and storing the tracking points if the difference is within the corresponding pre-determined threshold range.

14. The method of claim 13, further comprising estimating a vector orientation angle by determining the angle between a vector joining the tracking points and a horizontal axis and storing the tracking points if the vector orientation angle is substantially the same as the fiber alignment angle of the corresponding fiber.

15. A system for characterizing a fibrous material having a plurality of fibers, the system comprising:

a memory configured to store at least one image of the fibrous material;

a processing circuit configured to process the at least one image to characterize the plurality of fibers, the processing circuit comprising a fiber identification module configured to identify each of the plurality of fibers based upon a magnitude and a direction of an intensity gradient of the image and a fiber tracking module configured to track each of the identified fibers based upon an angle between the intensity gradient of the image and a scan vector.

16. The system of claim 15, wherein the processing circuit is configured to estimate a plurality of structural parameters for each of the tracked fibers of the fibrous material.

17. The system of claim 16, further comprising an output module configured to display the plurality of structural parameters to a user of the system.

18. The system of claim 15, further comprising a user interface module configured to provide input parameters for processing the at least one image, and wherein the fiber tracking module is further configured to track each of the identified fibers based upon at least one of a diameter of the fiber, a fiber alignment angle, and a vector orientation angle of the fiber.

19. The system of claim 18, wherein the input parameters comprise pre-determined range for diameter of the fibers to be tracked, or a number of scans for tracking the plurality of fibers, or pre-determined thresholds for diameter of the fiber and fiber alignment angle, or combinations thereof.

20. The system of claim 15, wherein the fiber tracking module is configured to validate uniqueness of tracking points of each of the plurality of fibers based upon coordinates of midline points of respective fiber.

* * * * *

UNITED STATES PATENT AND TRADEMARK OFFICE
CERTIFICATE OF CORRECTION

PATENT NO. : 8,571,267 B2  
APPLICATION NO. : 12/870569  
DATED : October 29, 2013  
INVENTOR(S) : Katti et al.

Page 1 of 4

It is certified that error appears in the above-identified patent and that said Letters Patent is hereby corrected as shown below:

The title page showing the illustrative figure should be deleted to be replaced with the attached title page.

On Title Page 2, item (56), under "OTHER PUBLICATIONS", in Column 1, Line 56, delete "Internaltional" and insert -- International --, therefor.

On Title Page 2, item (56), under "OTHER PUBLICATIONS", in Column 2, Line 43, delete "Chemiacal" and insert -- Chemical --, therefor.

In the Drawings

The drawing sheets, consisting of Figs. 1 and 9, should be deleted to be replaced with the drawing sheets, consisting of Figs. 1 and 9, as shown on the attached pages.

In the Specification

In Column 2, Line 29, delete "FIG. 2" and insert -- FIG. 2. --, therefor.

In Column 5, Line 53, delete "embodiments;" and insert -- embodiments, --, therefor.

In Column 7, Line 3, in Equation (2), delete "$f[\vec{S}, \vec{\nabla} I(x_{exit}, y_{entry})] < 0$" and insert -- $f[\vec{S}, \vec{\nabla} I(x_{exit}, y_{exit})] < 0$ --, therefor.

In Column 9, Line 2, delete "and θ₁" and insert -- and $\theta_2$ --, therefor.

In Column 9, Line 7, delete "(θ2)" and insert -- ($\theta_2$) --, therefor.

Signed and Sealed this  
Twenty-second Day of April, 2014

Michelle K. Lee  
*Deputy Director of the United States Patent and Trademark Office*

(12) United States Patent
Katti et al.

(10) Patent No.: US 8,571,267 B2
(45) Date of Patent: Oct. 29, 2013

(54) IMAGE BASED STRUCTURAL CHARACTERIZATION OF FIBROUS MATERIALS

(75) Inventors: Dhirendra S. Katti, Kanpur (IN); Anupam Pal, Kanpur (IN); Shaunak G. Pandya, Ahmedabad (IN)

(73) Assignee: Indian Institute of Technology Kanpur, Kanpur (IN)

( * ) Notice: Subject to any disclaimer, the term of this patent is extended or adjusted under 35 U.S.C. 154(b) by 483 days.

(21) Appl. No.: 12/870,569

(22) Filed: Aug. 27, 2010

(65) Prior Publication Data
US 2011/0299784 A1 Dec. 8, 2011

(30) Foreign Application Priority Data
Jun. 2, 2010 (IN) .............. 1287/DEL/2010

(51) Int. Cl.
*G06K 9/00* (2006.01)
(52) U.S. Cl.
USPC ........... 382/111; 382/108; 382/110; 382/141; 382/190; 382/199
(58) Field of Classification Search
USPC ......... 382/108, 110, 111, 141, 190, 199, 197
See application file for complete search history.

(56) References Cited

U.S. PATENT DOCUMENTS

| | | | |
|---|---|---|---|
| 3,739,183 A | 6/1973 | Burton et al. | |
| 4,737,648 A | 4/1988 | Smith et al. | |
| 4,841,223 A | 6/1989 | Baum et al. | |
| 5,309,221 A | 5/1994 | Fischer et al. | |
| 5,311,290 A | 5/1994 | Olson et al. | |
| 5,841,892 A * | 11/1998 | McGrath et al. | 382/141 |
| 6,099,960 A | 8/2000 | Tennent et al. | |
| 6,370,271 B2 | 4/2002 | Fu et al. | |
| 6,806,955 B2 | 10/2004 | Jang | |
| 2005/0047643 A1* | 3/2005 | Lowe | 382/141 |
| 2008/0281554 A1* | 11/2008 | Cork et al. | 702/150 |

OTHER PUBLICATIONS

Ashammakhi, N. et al., "Advancing tissue engineering by using electrospun nanofibers," *Regenerative Medicine*, Jul. 2008. vol. 3, No. 4, pp. 547-574.
Balguid, A. et al., "Tailoring Fiber Diameter in Electrospun Poly(epsilon-Caprolactone) Scaffolds for Optimal Cellular Infiltration in Cardiovascular Tissue Engineering," *Tissue Engineering: Part A*, Feb. 2009, vol. 15, No. 2, pp. 437-444.
Chen, M. et al., "Role of Fiber Diameter in Adhesion and Proliferation of NIH 3T3 Fibroblast on Electrospun Polycaprolactone Scaffolds," *Tissue Engineering*, Mar. 2007, vol. 13, No. 3, pp. 579-587.
"Nanotechnology: Looking As We Leap," Environmental Health Perspectives, vol. 112, No. 13, (Sep. 2004) pp. A740-A749.

(Continued)

*Primary Examiner* — Wesley Tucker
(74) *Attorney, Agent, or Firm* — Foley & Lardner LLP

(57) ABSTRACT

A method for characterizing a fibrous material having a plurality of fibers is provided. The method includes accessing an image of the fibrous material with the plurality of fibers and identifying each of the plurality of fibers based upon a magnitude and a direction of an intensity gradient of the image. The method also includes tracking each of the identified fibers based upon at least one of a diameter of the fiber, a fiber alignment angle and a vector orientation angle of the fiber and estimating a plurality of structural parameters for each of the tracked fibers of the fibrous material.

20 Claims, 7 Drawing Sheets